(12) United States Patent
Cortez

(10) Patent No.: US 8,127,799 B2
(45) Date of Patent: Mar. 6, 2012

(54) AIRCRAFT FLUID TRANSPORT LINE REPAIR KIT AND METHOD OF USE THEREOF

(76) Inventor: Robert Cortez, Denver, CO (US)

( * ) Notice: Subject to any disclaimer, the term of this patent is extended or adjusted under 35 U.S.C. 154(b) by 920 days.

(21) Appl. No.: 11/958,766

(22) Filed: Dec. 18, 2007

(65) Prior Publication Data

US 2010/0229990 A1 Sep. 16, 2010

(51) Int. Cl.
*F16L 55/18* (2006.01)
(52) U.S. Cl. .......... 138/97; 138/177; 138/120; 138/109; 138/155
(58) Field of Classification Search .............. 138/97, 138/99, 109, 177, 178
See application file for complete search history.

(56) References Cited

U.S. PATENT DOCUMENTS

| | | | | |
|---|---|---|---|---|
| 2,823,049 A * | 2/1958 | Hombach | ...... | 285/31 |
| 3,775,828 A | 12/1973 | Kopenhaver | ...... | 29/859 |
| 4,037,861 A * | 7/1977 | Medney | ...... | 285/147.1 |
| 4,186,475 A | 2/1980 | Jonsson | ...... | 138/97 |
| 4,410,281 A * | 10/1983 | Crookes | ...... | 366/341 |
| 4,589,688 A | 5/1986 | Johnson | ...... | 285/12 |
| 4,639,016 A | 1/1987 | Rogers | ...... | 285/15 |
| 4,848,802 A | 7/1989 | Wolf | ...... | 285/39 |
| 5,375,887 A | 12/1994 | Johnson | ...... | 285/12 |
| 5,499,882 A * | 3/1996 | Waterhouse | ...... | 403/171 |
| 5,564,176 A | 10/1996 | Garcia | ...... | 29/402.08 |
| 5,689,938 A | 11/1997 | Lyall | ...... | 53/445 |
| 5,778,935 A | 7/1998 | Koch | ...... | 138/97 |
| 6,902,210 B1 | 6/2005 | Rowley | ...... | 285/386 |
| 6,976,710 B1 | 12/2005 | Bedford | ...... | 285/15 |
| 2006/0185639 A1 * | 8/2006 | Rosenbaum | ...... | 123/184.21 |
| 2006/0284412 A1 | 12/2006 | Shipman | ...... | 285/12 |
| 2007/0125437 A1 | 6/2007 | Lazzara | | |
| 2007/0138788 A1 * | 6/2007 | Argo et al. | ...... | 285/134.1 |

\* cited by examiner

*Primary Examiner* — Patrick F Brinson
(74) *Attorney, Agent, or Firm* — Leyendecker and Lemire; Kurt Leyendecker

(57) ABSTRACT

A repair kit for use in repairing hydraulic lines, such as are found on aircraft, is described along with a method of utilizing the repair kit to repair hydraulic lines in aircraft. The kit in its most basic form comprises one or more series of rigid hydraulic line tubing sections. Each series comprises a plurality of tubing sections bent to a variety of different angles. To repair a leaking or damaged line, the repair technician removed the damaged section. If the damaged section includes a bend therein, the technician selects a repair tubing section having a similar bend. The repair section is appropriately sized and secured into place to complete the repair.

17 Claims, 7 Drawing Sheets

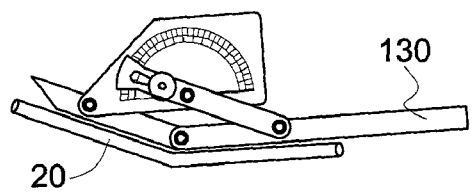
Figure 5B
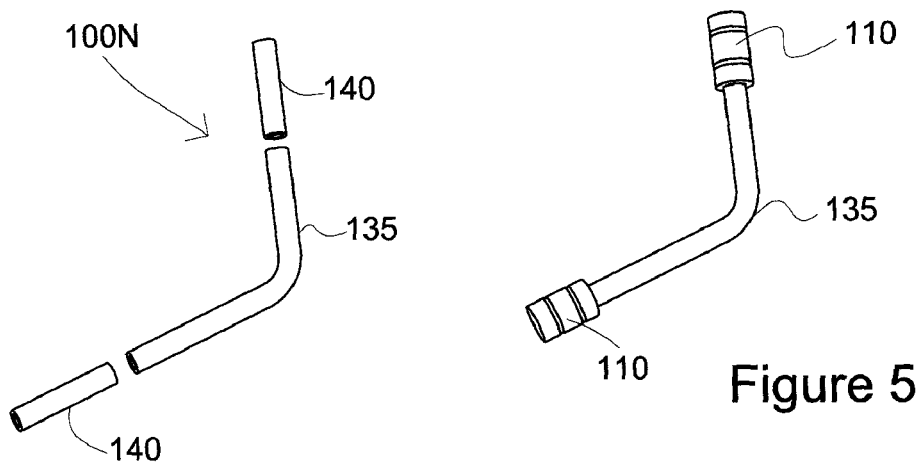
Figure 5C
Figure 5D
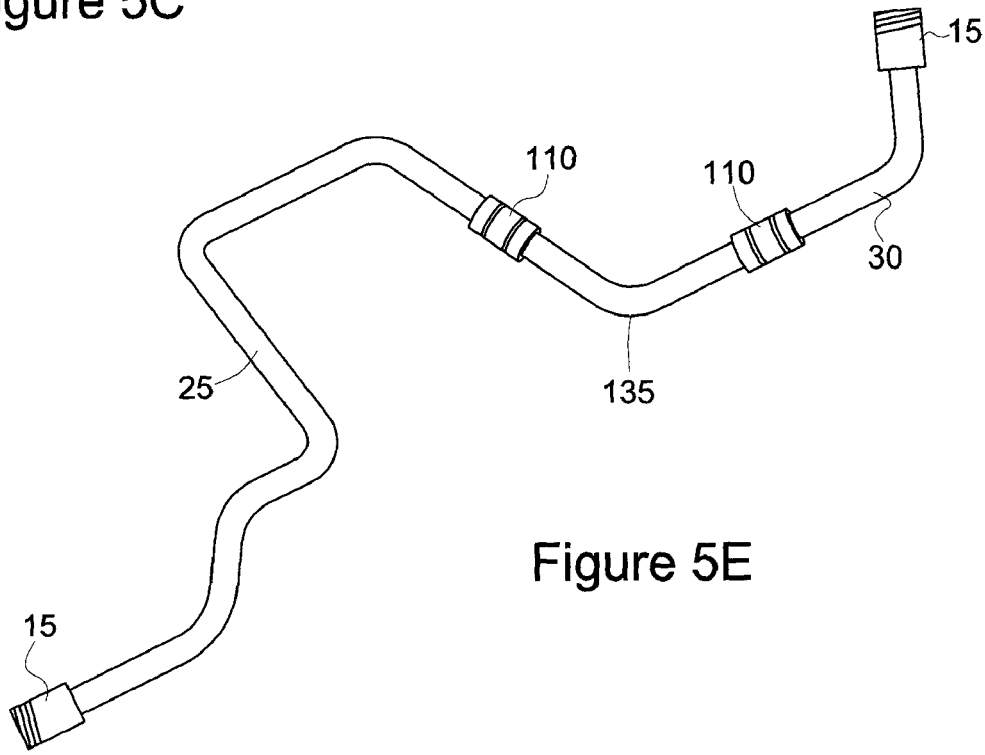
Figure 5E

AIRCRAFT FLUID TRANSPORT LINE REPAIR KIT AND METHOD OF USE THEREOF

FIELD OF THE INVENTION

The present invention relates generally to the repair of hydraulic lines such as our utilized in aircraft.

BACKGROUND

Commercial, cargo, private, corporate and military aircraft rely extensively on both high pressure and low pressure hydraulic lines for their proper and safe operation. For instance, the control surfaces on high performance aircraft are mechanically actuated through hydraulic control systems. The extension and retraction of land gear are also typically hydraulically actuated. Further, many additional functions of an aircraft, some critical and some less than critical, are operative through hydraulics.

When a leak develops in fight critical hydraulic control systems, the associated aircraft is typically grounded until the leak can be repaired. On many commercial, cargo, private, corporate and military aircraft, the hydraulic tubing that transports the pressurized fluid is comprised of rigid stainless steel, titanium and/or aluminum wherein the aluminum tubing is typically reserved for low pressure usage and the higher strength materials are used in high pressure hydraulic lines. A typical hydraulic line may be bent in a multitude angles and places as it snakes itself around the various components and structure of an aircraft from its proximal to distal ends whereat it is connected or coupled to other conduit or other components of the hydraulic system.

As can be appreciated, the probability that any one hydraulic line will fail of the hundreds if not thousands on a particular aircraft is extremely low. Accordingly, airlines do not typically stock the various hydraulic line sections as repair parts at its various repair facilities around the country and the world. To repair damage or a leak, the necessary section of hydraulic tubing is ordered from the appropriate manufacturer who specially fabricates the section as the typical aircraft repair facility does not have the specialized equipment available for bending hydraulic tubing without unintentionally crimping or otherwise damaging the tubing.

From the time the replacement tubing section is ordered to the time of its delivery and installation can take anywhere from days to weeks costing an airline thousands if not hundred of thousands of dollars because of the grounded aircraft.

One known work around that minimizes the downtime of an aircraft is to replace the leaking portion of a rigid pressure tube section with a temporary flexible tube replacement thus minimizing the aircraft's downtime. Procedurally, the leaking portion is cut from the affected hydraulic line, fittings having threaded ends are swaged or otherwise secured into place on the line, and a suitable flexible tube with corresponding threaded ends is secured to the fittings to complete replacement of the damaged portion. Current FAA rules classify a flexible hose repair of high pressure hydraulic lines as only temporary and permit its use for no more than 40 hours of flight time before it must be replaced with a permanent repair. Even under the best conditions, the affected aircraft must undergo two costly repair procedures.

BRIEF DESCRIPTION OF THE DRAWINGS

FIGS. 5a-e are graphical representations of the operations typically performed in repairing a portion of a high pressure hydraulic tubing section as indicated in FIG. 3 according to an embodiment of the present invention.

DETAILED DESCRIPTION

Figure 1:
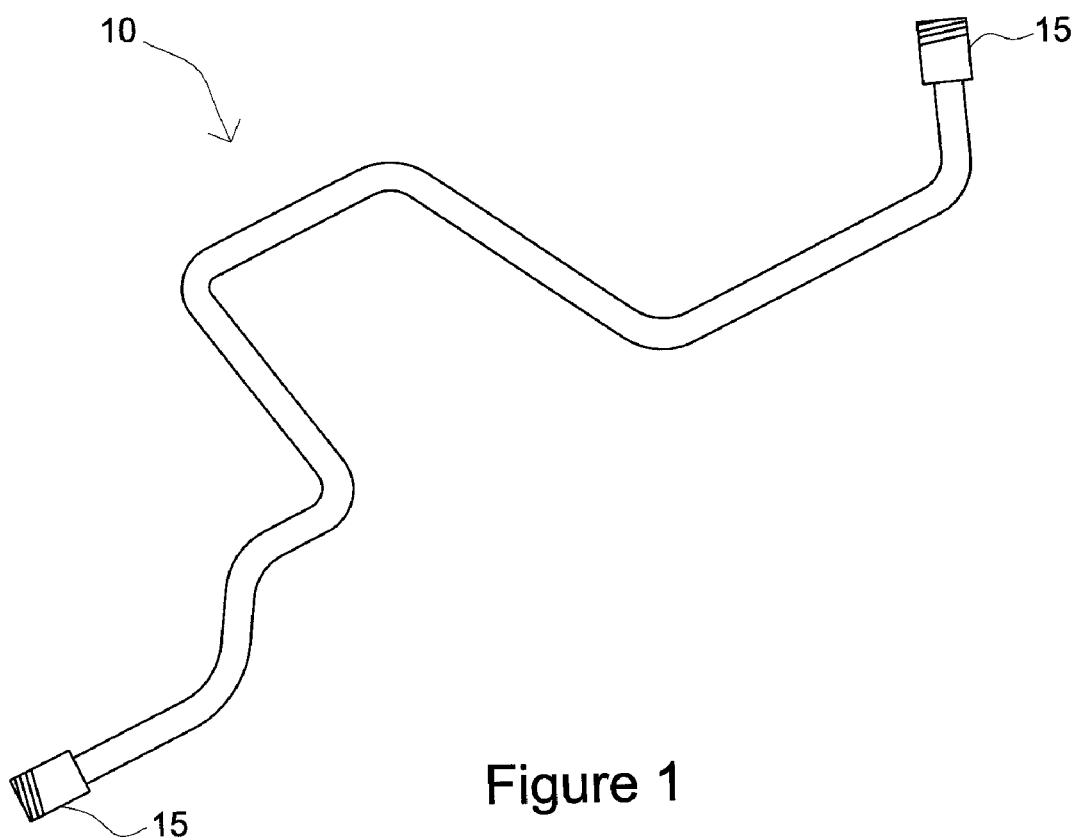
FIG. 1 is an isometric representation of a high pressure hydraulic tubing section as could be used in an aircraft.

In embodiments of the present invention, a repair kit for use in the permanent repair of rigid hydraulic lines, such as those found on commercial, cargo, private, corporate and military aircraft is described. Variations can include additional functionality permitting the kit's use in making temporary repairs of hydraulic lines.

At its core, an embodiment of the repair kit comprises a series of hard tubing sections that are pre-bent to a plurality of varying angles. Each tubing section of a particular size typically has a similar axial length and diameter but vary relative to other tubes in the kit in relation to a bend that is typically located near the axial midpoint of the tube. For instance in one embodiment, one or more linear unbent sections of tubing are provided and sixteen bent tube sections are provided that vary from a 15 degree bend to a 90 degree bend in five degree increments. In variations more than one tube in each bend angle can be provided and the angular increment of the various bend angles can be more or less than five degrees.

The various tubing sections are typically constructed of materials approved for use in aircraft hydraulic lines and have diameters similar to those of the hydraulic line sections they are configured to repair. For instance, one kit to repair a particular type of aircraft or particular grouping of different model aircraft can have six series of hard tubing sections. Each tube in one series has an outside diameter of 0.250" and is comprised of stainless steel. Each tube in the next larger series has an outside diameter of 0.375" and is also comprised of stainless steel, and each tube in a third series has a diameter of 0.500" and is comprised of stainless steel. The stainless steel tubing sections are typically used to repair high pressure hydraulic lines within the aircraft that are comprised of either titanium or stainless steel. Further, fourth, fifth and sixth series are provided in similar diameters as the stainless steel series except they are typically comprised of an aluminum alloy. The aluminum alloy tubing sections are typically used is repair damaged low pressure hydraulic lines typically comprised of aluminum alloy.

Embodiments of other kits may include a greater or lesser number of tubing series and/or as applicable tubing made of other materials. For instance, many aircraft, such as those used in the military, use titanium hydraulic lines. Accordingly, a repair kit configured for use on this type of aircraft may include one or more series of tubing sections comprising the proper titanium alloy. In some embodiments, stainless steel tubing sections may be provided to be used in repairing titanium alloy lines. Some kits can be assembled that include a plurality of series of tubing sections comprising titanium, aluminum and steel alloys which are approved standard aviation sizes wall thickness and bend radius.

In addition to one or more series of bent tubing of one or more diameters, embodiments of the repair kit can includes various connectors and fittings in sizes corresponding to the tubing to permit the replacement tubing sections to be permanently or temporarily secured in place when undertaking a repair. One tool typically included in certain embodiments of the repair kit includes a device for measuring the angles of portions of hydraulic tubing, such as a leaking portion of a hydraulic line in an aircraft that requires replacement.

Various other tools and components may be included in other embodiments of the repair kit as are desirable to increase the functionality and versatility of the kit. For instance, straight sections of aluminum alloy tubing may be included for making repairs to low pressure hydraulic lines replacing or augmenting pre-bent aluminum alloy tubing sections. Aluminum tubing can be more easily bent in the field without crimping and as such some embodiments of the kit further include a tube bender for bending the aluminum tubing. Suitable connectors and fittings of various types may also be provided for the tubing. In some instances, the pre-bent tubing for both low and high pressure applications may not be suitable for a particular repair and as such some embodiments also provide various standard aviation approved flexible hose sections that can be utilized for a temporary repair.

Other embodiments of the present invention comprise the methodology of repairing aircraft hydraulic lines using a repair kit having one or more characteristics of the aforementioned embodiments. Advantageously, most leaks in pressure hydraulic lines can be permanently repaired without having to order and wait for a specific custom bent hydraulic line section to be fabricated and shipped from an approved supplier.

TERMINOLOGY

The terms and phrases as indicated in parenthesis (" ") in this section are intended to have the meaning ascribed to them in this section applied to them throughout this document including the claims unless clearly indicated otherwise in context.

The term "or" as used in this specification and the appended claims is not meant to be exclusive rather the term is inclusive meaning "either or both".

References in the specification to "one embodiment", "an embodiment", "a preferred embodiment", "an alternative embodiment", "embodiments", "variations", "a variation" and similar phrases means that a particular feature, structure, or characteristic described in connection with the embodiment(s) or variation(s) is included in at least an embodiment or variation of the invention. The appearances of the phrase "in one embodiment" or "in one variation" in various places in the specification are not necessarily all referring to the same embodiment or variation.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

As used herein unless otherwise indicated, the phrases "hydraulic line", "hydraulic tubing" and similar variations thereof refer to any tubing and/or conduit adapted to carry fluid.

Embodiments of Aircraft Hydraulic Line Repair Kits

FIG. 1 is a representation of a hydraulic line as are often found in commercial, cargo, private, corporate and military aircraft. While the specific hydraulic line that is illustrated does not represent any particular part from any known aircraft, it is nonetheless representative of hydraulic lines found in aircraft. Specifically, any single line can include a number of bends having a number of different bend angles and extend in any of number of directions as is necessary to snake the line around the structure and various other elements of an associated aircraft. The representative hydraulic line is shown having threaded ends 15 that presumably would be coupled hydraulic components such as pumps and actuators within the aircraft. It is to be appreciated however, that not all lines will have threaded ends. Further, while this line is shown as being detached and removed from its associated aircraft, it is to be appreciated in the case of many if not most repairs performed on high pressure hydraulic lines using embodiments of the repair kit will be performed without removing the damaged or leaking line.

Figure 2:
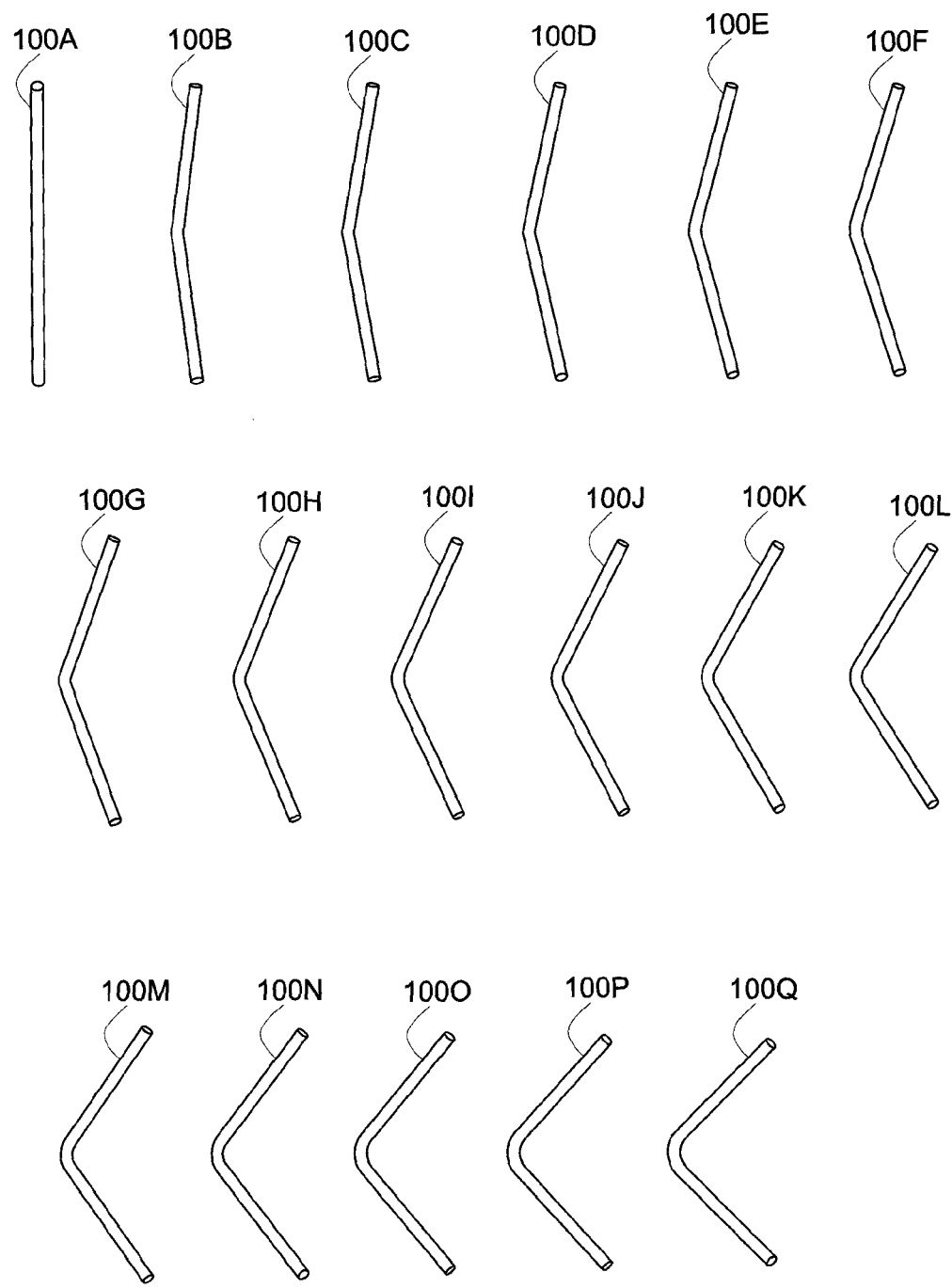
FIG. 2 is a representation of a plurality of hydraulic tubing sections of a common diameter wherein each individual section has a different bend angle than the others according to an embodiment of the present invention.
Figure 3:
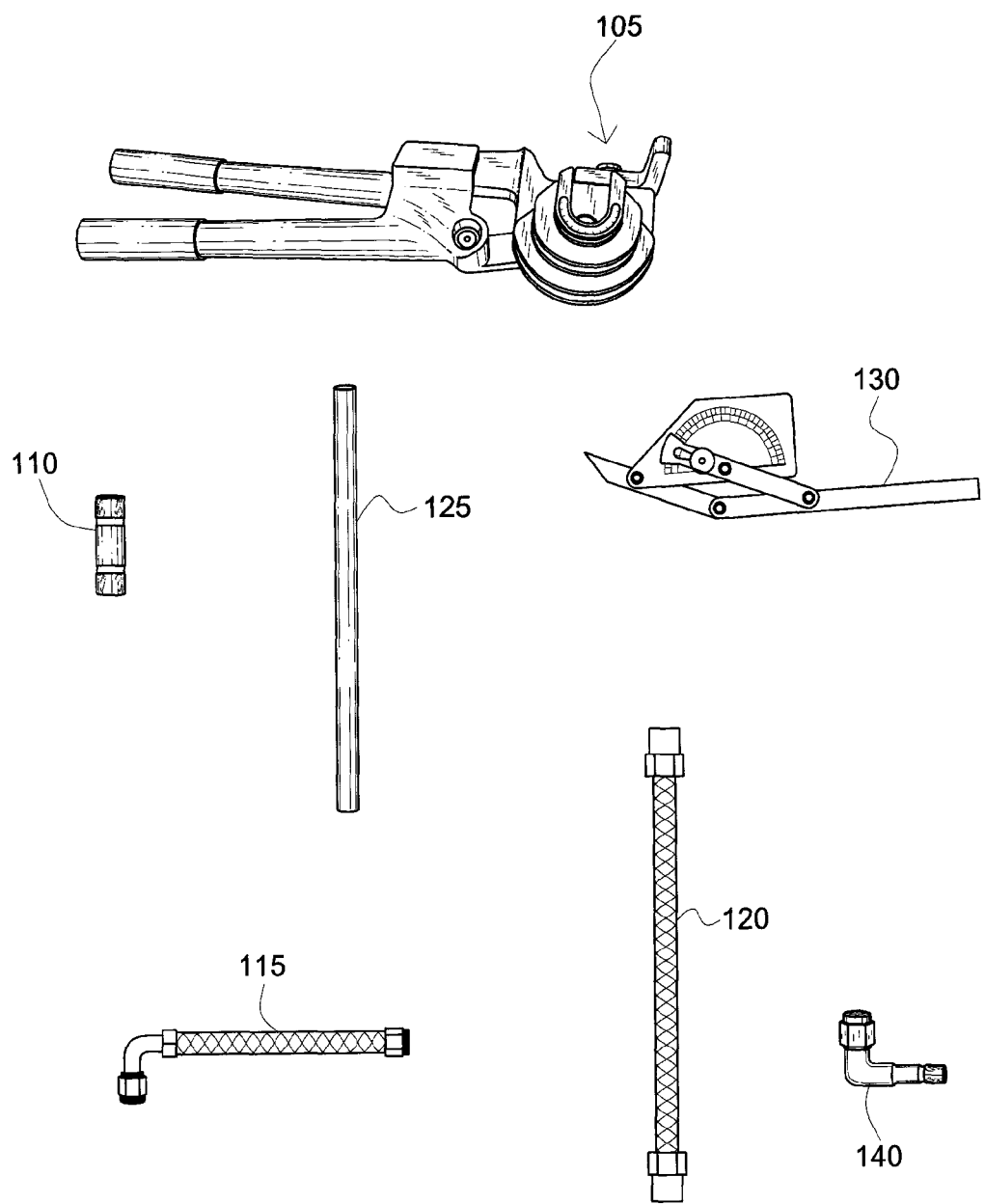
FIG. 3 is a representation of other parts, components and tools typically provided with the repair kit according to an embodiment of the present invention.
Figure 6:
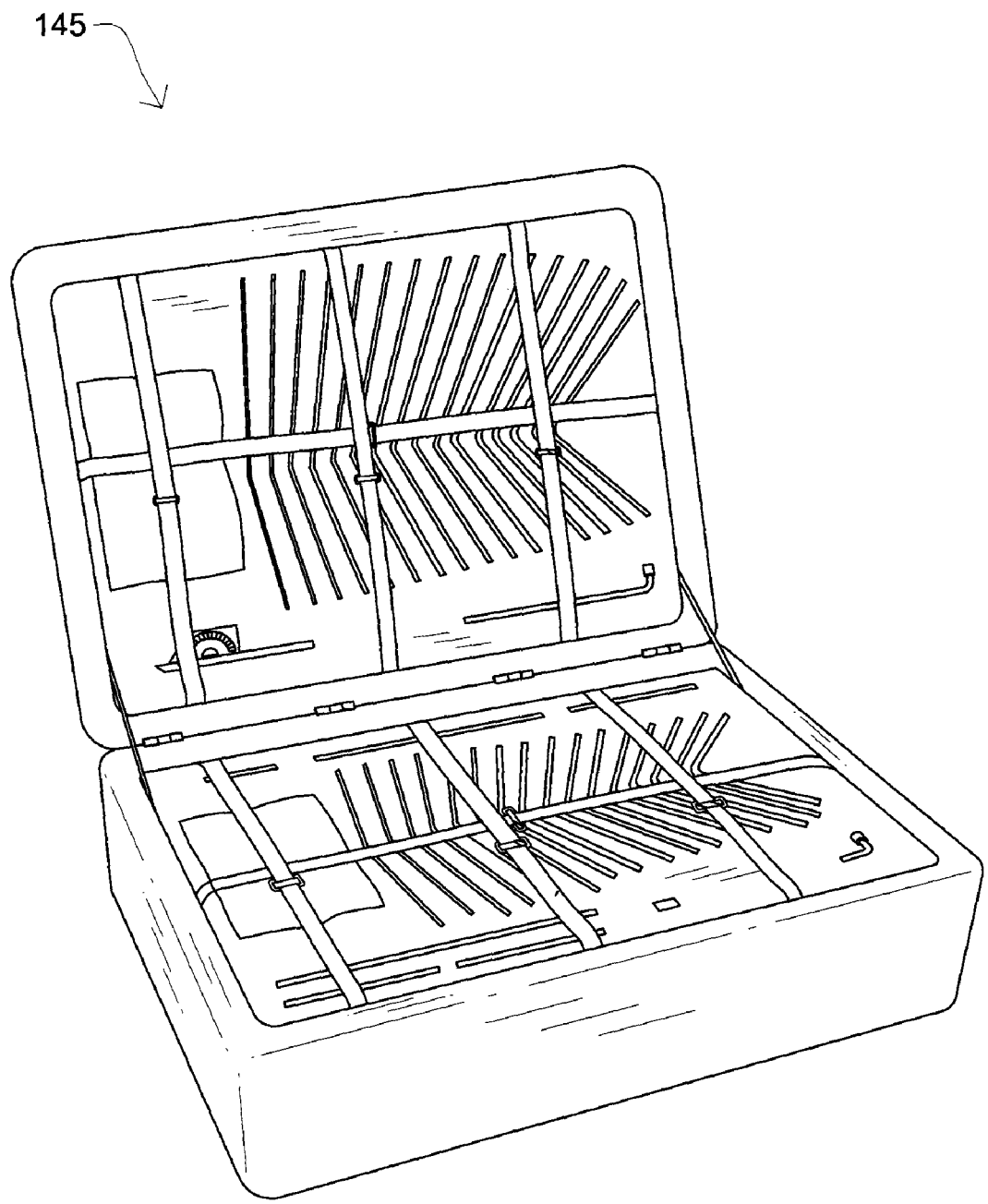
FIG. 6 is an illustration of the repair kit stowed in its associated case according to an embodiment of the present invention.

Referring primarily to FIGS. 2, 3 & 6, the contents of a typical repair kit according to an embodiment of the present invention is described herein below. As illustrated in FIG. 2, embodiments of the repair kit comprise one or more series of tubing sections 100. Each series comprises a plurality of tubing sections of an aviation standard approved material of a specific diameter, wall thickness and bend radius for use in repairing a hydraulic line of a similar or compatible material and diameter in an aircraft. It is noted that hydraulic high pressure lines in an aircraft are often comprised of titanium alloy to save weight, but that stainless steel tubing sections of similar dimension often can be utilized to repair the titanium lines. The tubing sections typically have an axial length of about 15 inches although the length may vary significantly and substantially in variations of the kit and are either straight or have a bend of a predetermined angle formed thereon proximate their axial centers.

Each series includes tubing sections of different angles typically varying from one or more other tubes in the series by a predetermined angular increment. For instance in a series of tubes 100A-Q in one variation, one or more straight tubes 100A of a given material and diameter are provided along with one or more tubes 100B-100Q bent to each of the following angles in five degree increments: 15, 20, 25, 30, 35, 40, 45, 50, 55, 60, 65, 70, 75, 80, 85 & 90 as specifically illustrated in FIG. 2.

The actual angles and the increments therebetween can vary depending on the variation and the particulars of the diameter and material of which the tubing sections are comprised. Further, in certain variations the bends are incremented in a single predetermined angular increment while in other series the incremental angles may vary between tubing sections. By providing a plurality of tubing sections of different bend angles, at least one tubing section exists within a series contained in a fully stocked kit that can be utilized to repair most leaks or other damage to a pressure hydraulic line 10 of a similar diameter and material proximate any particular bend or straight section of the hydraulic line. Preferably, the angle increment between tubing sections is about 10 degrees or less and more preferably about 5 degrees. It is further noted that very low angle bends (<15 degrees) are usually not utilized in aircraft and as such tubing sections having such low angle bends may not be provided in some variations of the repair kit.

As indicated above embodiments and variations of the repair kit typically comprise at least one series of tubing sections but often will include more than one tubing series.

For instance, a repair kit may include a tubing series corresponding to each type of pressure line contained in a particular aircraft or particular series of aircraft that the repair kit is configured to service. In at least one variation of a repair kit embodiment, the kit contains six tubing section series: one series comprised of 0.250" diameter stainless steel hardline; one series comprised of 0.375 diameter stainless steel hardline; one series comprised of 0.500" diameter stainless steel hardline; one series comprised of 0.250" diameter aluminum alloy hardline; one series comprised of 0.375 diameter aluminum alloy hardline; and one series comprised of 0.500" diameter aluminum alloy hardline. The six tubing section series correspond to the six types of pressure hydraulic line that are contained within a CRJ700/900 aircraft.

In another variation of a repair kit embodiment, the kit contains four tubing section series: one series comprised of 0.625" diameter stainless steel hardline; another series comprised of 0.750 diameter stainless steel hardline; one series comprised of 0.625" diameter aluminum alloy hardline; and another series comprised of 0.750 diameter aluminum alloy hardline. The four tubing section series correspond to the four types of pressure hydraulic line that are contained within a CRJ700/900 aircraft.

In yet other variations, there can be sizes and types of tubing suitable for a variety of aircraft so as to be capable of servicing a portion or the whole of the fleet flown by a particular airline or service. As can be appreciated, the size of the repair kit and the number of series of tubing can vary greatly depending on the intended use of the kit and which aircraft it is configured to service.

Although not specifically illustrated each tubing section 100 included in repair kit embodiments is typically marked with a tag, a sticker, a label or by other means to indicate its particular part number. In many variations, the marking comprises a bar code. The marking may be easily removable so that a repair technician can use it to order a replacement tubing section for the kit after the tubing section to which the marking was formally associated is used. In some variations of the kit order or requisition forms may also be provided such that the repair technician can easily use the form to reorder any components used from the kit. It is to be appreciated that the various other expendable components in a repair kit embodiment, such as connectors and/or fittings, may also be similarly marked to permit easy inventory control and restocking of the components and parts within a kit.

Also included in a typical repair kit according to at least one embodiment are a plurality of swage-type fittings 110 & 140 as illustrated in FIG. 3 by which the a repair tubing section can be permanently fitted to a repaired hydraulic line using a suitable swaging tool as is often commonly available at aircraft repair facilities. Typically, several straight swage fittings 110 will be provided for each series of tubing sections as well as several elbow swage fittings and one or more swage fittings 140 including male or female threaded ends. Other types of fittings and connectors may be provided in yet other variation and embodiments. For instance, fittings that are cryogenically secured in place may be provided as might other compression type fittings. Further, flare type fittings may be provided. The exact type of fitting(s) provided will depend on the aircraft or series of aircraft a particular embodiment repair kit is configured to repair and the types of fittings that are approved for use in the particular aircraft or series of aircraft.

Still referring to FIG. 3, several flexible hose sections 115 & 120 with threaded and or swage type end fittings may also be provided for each size of high and low pressure tubing the repair kit embodiment is adapted to repair. While flexible tubing repairs are only temporary, there may be situations wherein the appropriate size rigid tubing section is not available. For instance, if the needed size and bend of tubing section was used in a previous repair and the replacement tubing section has not yet arrived to replenish the kit, a flexible tube can be utilized. In other instances, with aircraft maintenance manual or manufacturer approval, the location or characteristics pertaining to the damaged hydraulic line and repair thereof may not facilitate the use of a rigid repair tubing section in which case a flexible tube can be utilized. As shown, flexible tubes may be provided that have inline threaded fittings or threaded fitting ends that are oriented 90 degrees relative to the axis of the flexible tube.

In addition, certain embodiment repair kits may include one or more straight pieces of aluminum alloy tubing 125 in various sizes. Since small diameter soft aluminum tubing can often be bent without kinking unlike the small diameter high pressure tubing, a tube bender 105 may also be provided in the repair kit so that the aluminum tubes may be fashioned as necessary. It is to be appreciated that bending a piece of aluminum alloy tubing to an exact angle using a hand bender can be difficult and can if not properly done, damage the tubing section. Accordingly, in other embodiments of the repair kit, pre-bent aluminum alloy tubing sections are provided in much the same manner as the steel and titanium pre-bent tubing sections for use in a substantially similar manner. In some variations, both a tube bender and pre-bent series of aluminum alloy tubing sections are provided. Appropriate connectors and fittings are also often provided to facilitate connection of the replacement aluminum tubing sections to the repaired hydraulic lines.

In addition to the various tubing series 100, flexible hoses 115 & 120, and associated connectors and fittings 110 & 140, one or more tools 105 & 130 are often provided in repair kit embodiments to facilitate quick and easy repair of aircraft hydraulic lines. These tools typically include the aforementioned tube bender 105 for use on the low pressure aluminum tubing sections, and an angle measure 130. The angle measure's primary function is to measure the angle of a damaged portion of a hydraulic line 10 that requires repair. Based on the measured angle a suitable section of tubing can be selected from the appropriate series in the repair kit. The measure can also be utilized to reference the angle on a repair tubing section 100. It is appreciated that other linear scales may also be provided or that a repair technician may rely on scales, calipers and/or angle measures that may already be available in a repair facility.

Referring to FIG. 6, an embodiment of a repair kit contained in a transportable case is illustrated. All the components and tools, such as described in FIG. 3, are neatly stowed therein. The case may include wheels to facilitate easy transport. In other variations, the repair kit may not be contained in any particular container but may be stowed in one or more cabinets or other storage means within a repair facility.

Figure 4:
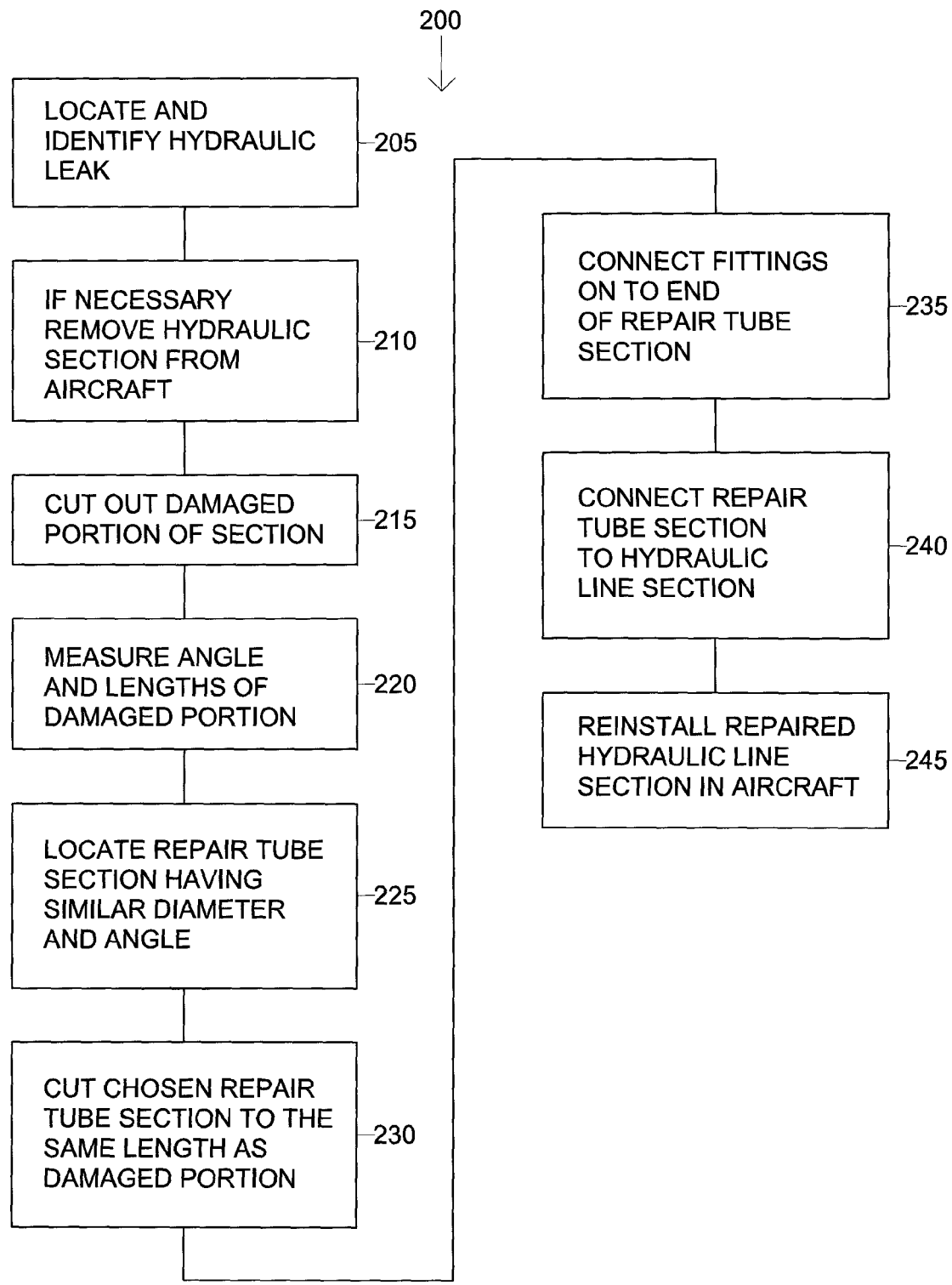
FIG. 4 is a flow chart indicating a process for permanently repairing a leaking portion of a pressure hydraulic tubing section, such as illustrated in FIG. 1, according to an embodiment of the present invention.

A Method of Repairing a Damaged Hydraulic Line According to Another Embodiment of the Present Invention FIG. 4 is a flow chart illustrating a method for repairing a hydraulic line on an aircraft. Although embodiments of the repair process and embodiments of the repair kit are described in relation to an aircraft, the kit and process may also be applied to repairing hydraulic lines that are not located within an aircraft as well.

As indicated in block 205 of FIG. 4, a leak or other damage to a pressure hydraulic line is identified and located. The presence of a leak may be identifiable within the cockpit of the associated aircraft as evidenced by the lower than normal pressure within a particular control system. The leak may be suspected because of improper operation of a particular hydraulic system. Further, the leak may be visually identified through routine inspection and maintenance of the associated aircraft. Once suspected, a repair technician will typically examine the tubing associated with the affected hydraulic system to locate the specific location of the leak if it is not already known.

Referencing block 210, the hydraulic line may be removed form the aircraft if convenient or necessary. Removal may not be practical or even desirable in all circumstances and often the repair will be performed on the aircraft.

Figure 5A:
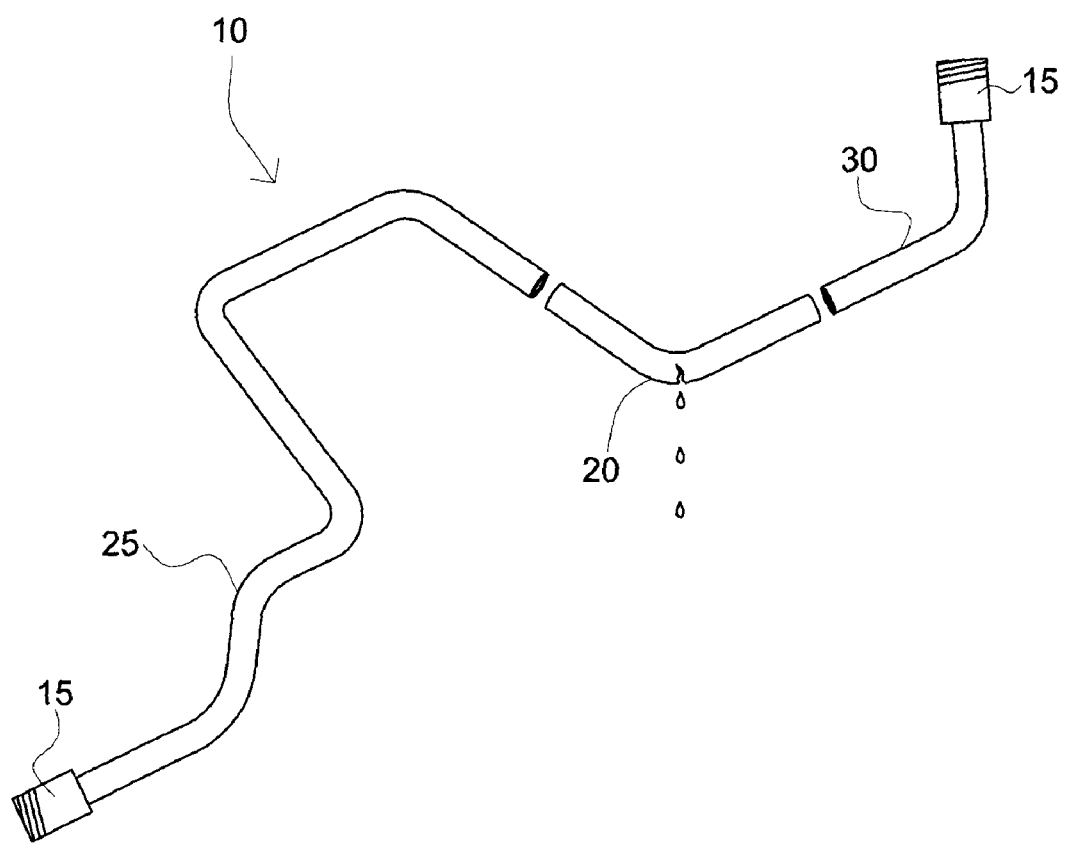

Next as indicated in block 215 and illustrated in FIG. 5*a*, the leaking or damaged portion 20 of the hydraulic line is cut from the remainder of the line 10 per standard aviation methods. Accordingly, the remaining undamaged portions of the hydraulic line include both an upstream portion 30 and a down stream portion 25, each with end proximate the removed damaged portion. It is appreciated that the amount of tubing removed on either side of the leak or damage is determined to ensure there is enough linear line on either end of the cut to facilitate swaging a swag fitting in place to receive and secure a repair tubing section to the hydraulic line. It is appreciated other types of fittings may be utilized in place of a swage type fitting in variations of the described method as would be obvious to one of ordinary skill in the art to which the invention pertains. Also, the length of the removed portion is selected such that it is no longer than the repair tubing section to be swaged in place as a replacement. Accordingly the axial length of the removed damaged portion is typically no longer than 15" in one embodiment when the repair tubing sections have axial lengths of 15" and often the removed length of the damaged portion is much less.

As shown in FIG. 5*b* and as referenced in block 220 of FIG. 4, the angle of the removed damaged portion 130, as applicable, is measured often using the described angle measuring device 130. The angle of the damaged portion 20 can also be measured prior to removing the damaged portion from the hydraulic line 10 as is practical. The lengths of the linear portions of the damaged section in either side of the bend are also measured so that the necessary length and the corresponding linear sections on the repair tubing section 100 having the same bend angle can be determined.

Based on the measurements of the damaged portion 20, a suitable repair tubing section is selected from an embodiment of the repair kit as described in detail above. The replacement tubing section 100*n* is typically comprised of the same material and has the same diameter as the affected hydraulic line 10. Of the various tubing sections available in the repair kit for the particular diameter and material of the affected hydraulic line, the tubing section having the closed bend angle as the removed damaged portion 20 is selected and is indicated in block 225.

As indicated in block 230 and as illustrated in FIG. 5*c*, the chosen repair tubing section 100*n* is cut to create a sized repair section 135 that generally matches the removed damaged portion 20. The removed end portions 140 of the repair tubing section are typically discarded.

Next as indicated in block 235 and as illustrated in FIG. 5*d*, appropriate swage fittings 110 are selected from the repair kit and swaged onto the sized repair section. It is appreciated that the fittings can also be swaged (other otherwise secured) onto the ends of the respective sections 25 & 30 of the affected hydraulic line before attachment to the sized repair section 135 as deemed appropriate by the repair technician.

Finally, as indicated in block 240 and illustrated in FIG. 5*e*, the sized repair section is installed on the hydraulic line 10 and swaged (other otherwise secured) in place completing the repair. As necessary and as applicable as indicated in block 245, the repaired hydraulic line can be reinstalled on the aircraft.

Alternative Embodiments and Other Variations

The various preferred embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art given the benefit of this disclosure. All variations of the invention that read upon the appended claims are intended and contemplated to be within the scope of the invention.

I claim:

1. A kit for repairing aircraft hydraulic lines, the kit comprises:
   one or more series of rigid hydraulic line tubing sections, each series includes a plurality of tubing sections bent to a variety of different bend angles between 5 degrees to 90 degrees, each tubing section within a series being comprised of a same aviation standard approved material and having a same diameter as other tubing sections within the series; and
   a plurality of aviation standard fittings, each fitting being configured to couple with a tubing section from at least one of the one or more series;
   wherein a difference in the bend angle of each tubing section in a series of the one or more series differs from the angle of at least one other tubing section in the series by about five degrees.

2. The kit of claim 1 wherein each series of the one or more series further comprises one or more straight and unbent tubing sections of the same diameter and material as the bent tubing sections of the series.

3. The kit of claim 1, wherein a series of the one or more series includes tubing sections bent to about the following angles in degrees: 15; 20; 25; 30; 35; 40; 45; 50; 55; 60; 65; 70; 75; 80; 85 & 90.

4. The kit of claim 3, wherein the series further includes one or more unbent tubing sections.

5. The kit of claim 1 wherein the aviation standard fittings further comprise swage fittings.

6. The kit of claim 1, wherein the tubing sections of the one or more series comprise at least one of a titanium alloy, aluminum alloy and a stainless steel.

7. The kit of claim 1 wherein the one or more series of rigid hydraulic line tubing sections includes: a first series of tubing sections having a diameter of 0.250"; a second series of tubing sections having a diameter of 0.375"; and a third series of tubing sections having a diameter of 0.500".

8. The kit of claim 1 wherein the one or more series of rigid hydraulic line tubing sections includes: a first series of tubing sections having a diameter of 0.625"; and a second series of tubing sections having a diameter of 0.750".

9. The kit of claim 2 further including: (a) an angle measuring device; and (b) flexible repair tubing.

10. The kit of claim 9, further including: (i) one or more sections of unbent aviation standard approved aluminum alloy tubing; and (ii) a tube bender adapted to bend the aluminum alloy tubing.

11. The kit of claim 1 wherein in each tubing section in each series is marked with identifying indicia.

12. The kit of claim 10, further comprising a portable case wherein the other contents of the kit are contained.

13. A method of repairing a damaged rigid hydraulic line, the method comprising:
- identifying damage or a leak in the hydraulic line;
- removing a portion of the hydraulic line including the leak and/or damage by cutting it out of the remainder of the hydraulic line, the portion including a single bend;
- measuring an angle of the single bend and dimensions of the portion;
- selecting a tubing section matching the diameter of the hydraulic line from a repair kit, the tubing section having a bend angle similar to the angle of the single bend, the repair kit including one or more series of rigid hydraulic line tubing sections, each series includes a plurality of tubing sections bent to a variety of different angles between about 5 degrees to about 90 degrees, each tubing section within a series being comprised of the same material and having the same diameter as other tubing sections within the series;
- cutting the tubing section to match the dimensions of the portion; and
- installing the tubing section into the remainder of the hydraulic line wherein said installing the tubing section comprises connecting the tubing section to the remainder of the hydraulic line using aviation standard fittings.

14. The method of claim 13, wherein the fittings are selected from the repair kit.

15. A method of repairing a damaged rigid hydraulic line, the method comprising:
- identifying damage or a leak in the hydraulic line;
- removing a portion of the hydraulic line including the leak and/or damage by cutting it out of the remainder of the hydraulic line, the portion including a single bend;
- measuring an angle of the single bend and dimensions of the portion;
- selecting a tubing section matching the diameter of the hydraulic line from are air kit the tubing section having a bend angle similar to the angle of the single bend, the repair kit including one or more series of rigid hydraulic line tubing sections, each series includes a plurality of tubing sections bent to a variety of different angles between about 5 degrees to about 90 degrees, each tubing section within a series being comprised of the same material and having the same diameter as other tubing sections within the series;
- cutting the tubing section to match the dimensions of the portion; and
- installing the tubing section into the remainder of the hydraulic line;
- wherein the damaged rigid hydraulic line is located in an aircraft.

16. The repair kit for use in repairing damaged fluid transport lines in aircraft, the kit comprising:
- a transportable case to house the remainder of the kit;
- one or more series of rigid hydraulic line tubing sections, each series includes a plurality of tubing sections bent to a variety of different angles between about 5 degrees to about 90 degrees in angular increments of about 5 degrees, the series also including one or more straight unbent tubing sections, each tubing section within a series being comprised of the same material and having the same diameter as other tubing sections within the series;
- a plurality of fittings sized in relation to the tubing sections of the one or more series;
- an angle measuring device for measuring the angle of a bend in the fluid transport lines; and
- one or more flexible tubing sections.

17. The repair kit of claim 16 further comprising one or more pieces of straight aluminum alloy tubing and a tube bender adapted to bent the aluminum alloy tubing to a desired angle.

* * * * *